United States Patent [19]

Hofmann et al.

[11] 4,204,635
[45] May 27, 1980

[54] LOCKER INSTALLATION WITH A CENTRAL CONTROL UNIT

[75] Inventors: Otto Hofmann, Nüremberg; Georg Nagler, Oberwildenau, both of Fed. Rep. of Germany

[73] Assignee: Tele-Alarm, Nachrichtentechnische Geräte GmbH, Herstellungs-und Vertriebsgesellschaft & Co. KG, Schwaig-Behringersdorf, Fed. Rep. of Germany

[21] Appl. No.: 927,686

[22] Filed: Jul. 25, 1978

[51] Int. Cl.² .................. G06K 5/00; G06K 15/00
[52] U.S. Cl. .................................. 235/382; 235/419
[58] Field of Search ............... 235/382, 419; 340/51, 340/153

[56] References Cited

U.S. PATENT DOCUMENTS

| | | | |
|---|---|---|---|
| 3,515,340 | 6/1970 | Mika | 235/382 |
| 3,665,160 | 5/1972 | Lopata | 235/382 |
| 3,761,683 | 9/1973 | Rogers | 235/382 |
| 3,959,632 | 5/1976 | Trehn et al. | 340/51 |
| 4,095,739 | 6/1978 | Fox et al. | 340/51 |

Primary Examiner—Daryl W. Cook
Attorney, Agent, or Firm—Browdy and Neimark

[57] ABSTRACT

Lockers of various designs, like those installed in railroad stations as self-service lockers for temporary storage of hand luggage are equipped with electromechanical remote control devices to permit opening or closing of the locker doors. The devices are connected to a central control unit. Coin testing devices and devices for measuring storage time are provided solely at a central location in the control unit for all of the lockers. A key card is issued as a receipt for the assigned and occupied locker, the card having a magnetic strip in which the number of this assigned locker and test data information are stored. Each time a locker is reassigned, the test data information on the newly issued key card assigned to this locker for the most recent use is modified in such manner that it no longer corresponds to any test data information issued earlier. When the key card is inserted in a reading slot, if no additional charges are to be paid, the locker to which the key card containing this test data information corresponds is permitted to open so that the stored material may be removed.

7 Claims, 5 Drawing Figures

LOCKER INSTALLATION WITH A CENTRAL CONTROL UNIT

BACKGROUND OF THE INVENTION

This invention relates to a locker installation having a central control unit and, more particularly, to such an installation provided with a memory and a circuit coupled thereto for manual interrogation and display of the occupancy status so as to control the lock opening devices of the respective lockers.

The locker installation of the above-mentioned type is known from German Offenlegungsschrift (laid open Patent Application) No. 2,218,956. According to this document, the responsibility of guards for a customer's safe deposit box vault in a bank have their task made easier by virtue of the fact that a guard located at a central control unit allows a specific safe deposit box to be opened by the customer himself using his personal key, by entering the number of the specific safe deposit box. For control purposes, means are provided for storing data which can be retrieved as necessary to determine which safe deposit boxes have been opened in the course of a day, and which safe deposit boxes are not locked at the moment.

The present invention is based on the fact that in extensive locker installations of the type which are installed in railroad stations, airports, bus stations and the like as luggage lockers, it is extremely inconvenient for users to look for an empty locker of the appropriate size and to be required to carry around with them a comparatively bulky key for reopening the locker to remove the objects stored therein. On the other hand, considerable maintenance is required to keep each individual locker with its coin tester, timer and especially a resettable lock to prevent unauthorized opening with duplicate keys, in operating order.

SUMMARY OF THE INVENTION

In view of the disadvantages associated with the afore-mentioned characteristics of use and operation of conventional locker installations in general use, the principal object of the present invention is to provide a locker installation of the type described hereinabove which offers users greater convenience and ensures much lower maintenance costs for the operators of the system.

The foregoing object, as well as others which are to become clear from the text below, is achieved in a locker installation of the type, having a central control unit provided with a memory and a circuit coupled thereto for manual interrogation and display of the occupancy status and, upon manual interrogation of the control unit, for temporarily effective and individual control of a locker lock opening device. A selector button, a payment amount due display, a payment comparator, a test data generator, a locker number display, a key card dispenser equipped with a magnetic strip recorder for the locker number and variable test data, as well as a temporarily effective locker door unlocking device are connected to the circuit. A computer and control system with memories, are provided. A key card reader with test data coincidence control circuitry is provided for reopening of the locker door, the reader being coupled to an occupied-time-determination circuit, the payment amount due display, the payment comparator, the locker number display and the temporarily effective locker locking and opening device.

In this solution, the user is spared the inconvenient search for an empty locker of the appropriate size; rather, it is sufficient to enter the required size for the objects to be stored in a central control unit, whereupon the amount to be paid for the basic storage period is displayed, and after the necessary charge has been paid, the locker number, in other words the location of this locker is displayed, after which a key card with a magnetic strip is removed from the control unit as a receipt for using this locker. When this key card is reinserted in the control unit (when the basic storage time has been exceeded), the additional charge is displayed; after the user has paid the additional amount, his locker number is displayed and the locker may now be reopened to remove the objects stored therein. Test data information stored in the magnetic strip on the key card, generated and stored in the magnetic strip before the goods are placed in the locker, in other words in conjunction with the issue of the key card, ensures that this key card cannot be used either to open another locker or even the locker just being assigned. When luggage is placed in this locker, the test data associated with this locker, to be stored on the next key card to be issued, are changed so that subsequent use of an old key card (with test data which are no longer valid) is ruled out. Hence, maintenance personnel are spared the previously necessary periodic resetting of the locks on the individual lockers to prevent unauthorized opening by duplicate keys or by original keys which have been retained, the uncertainty factor in this system being that previously there was always the fact that the lock could only be reset to a limited number of different key bit arrangements.

Moreover, in the locker installation according to the invention, the maintenance personnel responsible for such locker installations are spared the expense of checking proper operation of coin testers and timers, as well as unloading the coins individually from the individual locker doors, since a single timer and a single coin tester are provided for a practically infinitely large nunber of individual lockers in the central control unit and only a single timer and coin tester need to be maintained and/or emptied.

A preferred embodiment includes a time delay which is especially advantageous when a significant period of time can elapse in large locker installations while covering the distance from the central control unit to the assigned locker of the preselected size. If the locker door were opened immediately upon display of the locker number, after the required additional charge had been paid, there would be the danger than an unauthorized person who might chance to be in the vicinity of this locker and heard the operation of the electromechanical locking system, and therefore knew that the locker could be opened, would empty the locker before the authorized person could make his way from the central control unit to the locker whose number had been displayed.

A further measure according to a more detailed embodiment has the advantage that a flashing display directs the user's attention to the fact that additional money must be paid and locks out the locker number display of the locker which cannot be reopened until the additional charge has been paid.

The failure-prone electromechanical devices used in the locker installation according to the invention, such as a coin tester and a storage timer, are provided only once in the central control unit, thus minimizing the operating expenses which have to be taken into account in the type of locker installations previously employed, so that it is conceivable that no maintenance personnel whatsoever would be required directly at the locker installation. However, this would deprive the users of the possibility of consulting nearby maintenance personnel, for example in the event of problems with operating such locker installations. An improvement according to yet another more detailed embodiment in which an intercom is provided ensures that a user having problems operating the lockers would be able to consult trained personnel engaged in performing other work at a remote location.

In the case of large locker installations at railroad stations or other places with heavy traffic, the possibility cannot be excluded that one or more lockers will be rendered unusable because, for example, the last user left spoiled food in it. In such cases, it would be unfair to collect the fee from a user for a locker which he could not use, for example, because it was seriously contaminated. According to the measure provided in another detailed embodiment, the user can then get back the money he has paid by pressing a coin return button. In order to ensure that when this same user or another potential user, looking for a locker of this size, is not directed once again to the same locker which is admittedly unoccupied but unusable, this locker, which clearly ought not any longer be assigned, is eliminated from subsequent possible assignments by an additional measure, after it has been assigned several times in a row but has not been used. Non-usage despite assignment can be indicated for example with no great engineering effort by a door lock CLEAR signal not being received within a certain given period after the locker has been assigned or by the coin return button being operated without using the locker (i.e. by locking the door of the locker just assigned).

Because the failure-prone electromechanical parts of the locker installation are provided only once, specifically in the central control unit, failures are minimized and qualified personnel are not required to be trained in the operation of these locker systems. Indeed, the remaining minimum amount of maintenance work, taking the form in particular of cleaning out the lockers and emptying the coin box, can be performed by employees who have been hired and trained for other tasks. The additional measure, according to a further detailed embodiment, ensures that even these persons, who are not particularly well-trained in dealing with the locker installation, can work the necessary controls for the control and correction operations while the controls provided at the central control unit for operation by the public can be modified in their functional arrangement by actuating a personnel switch which is not accessible to the public. A mounting template is therefore provided to be able to carry out the necessary measures for such maintenance and control work by exchanging information with the actuating elements after the personnel switch has been actuated.

Hence, functional linkage can be provided such that this actuation of the personnel switch which is not accessible to the public and is mounted for example inside the housing of the central control unit, only becomes possible or effective when the mounting template is applied over the functionally modified arrangement of the individual controls.

Yet another additional measure according to a variant of the last-mentioned embodiment is especially significant in view of the fact that when reclaiming his property, the user admittedly has available his key card with the magnetic strip described above, but, if the locker has been used in the meantime by someone else, the insertion of this key card, because of changes in the test data which have been made in the meantime, no longer controls a locker which has had new property stored in it in the meantime and consequently will be unable to control any other display. In order to be able to determine nevertheless which locker this key card was assigned to, and in the event that the material was placed in the locker by using this key card (if such a time interval is stored on the magnetic strip), the additional measure will allow the maintenance personnel, who are supposed to check out the problem, to read and display the contents of the magnetic strip although no corresponding stored data are any longer present in the memory corresponding to the test data on this key card.

The additional measure according to yet a further detailed embodiment ensures that even those individuals who have not yet been familiarized with this locker installation, can carry out the necessary maneuvers in the correct sequence with the central control unit before occupying or reopening a locker, without having had to study inconvenient operating instructions regardless of whether they anything to put away or not.

BRIEF DESCRIPTION OF THE DRAWINGS

Further features and advantages of the invention are to become apparent from the following description of the preferred embodiment and variants shown in the drawings in which.

DETAILED DESCRIPTION OF THE PREFERRED EMBODIMENTS

Figure 1:
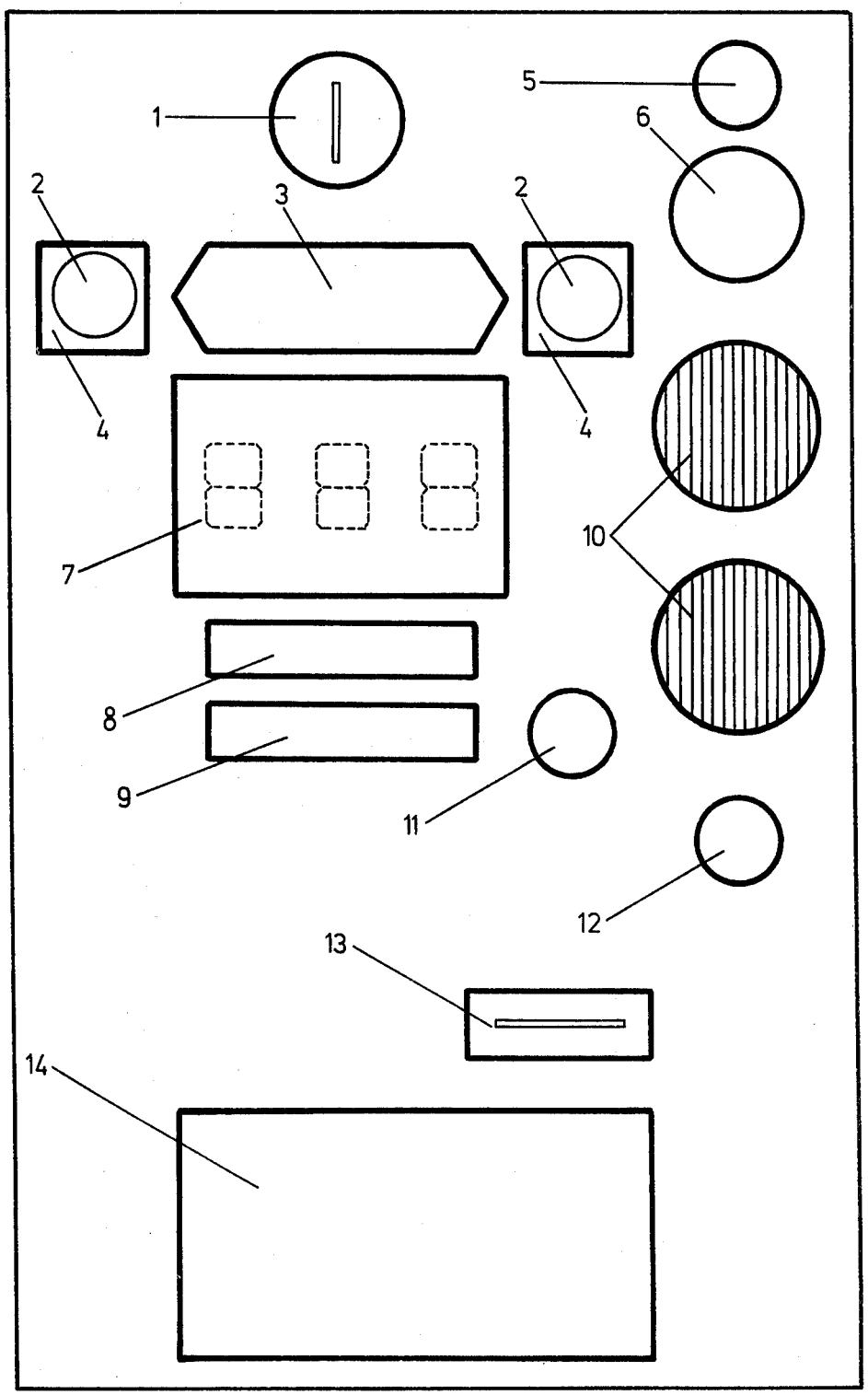
FIG. 1 shows a front view of a central control unit for a plurality of individual lockers.

In the front view of a central control unit according to FIG. 1, a coin slot 1 is visible above an instruction panel 3. Two selector buttons 4 are provided for the two available sizes of locker. "Occupied" displays 2 are integrated into the selector buttons 4, and indicate whether a locker of the size selected by one of selector buttons 4 is available. A coin button 5 is provided next to coin slot 1.

A display 6 which lights up when the maximum storage time has been exceeded, for which additional charges may be paid is provided below the coin return button.

Depending on the operating stage at a given moment, a display 7 indicates, for example at the top, the amount to be paid or to be paid in addition for using or reopening a locker, and below this is followed a display of the number of the locker which has been unlocked for use or for reopening. The figures which appear at a given moment on display 7 determine whether or not one of the two signs 8 INSERT MORE MONEY or 9 USE LOCKER light up.

An opening button 11 can be operated to actuate a locker lock-opening device to allow the stored objects to be removed, after any additional charge has been paid and the number of the locker to be opened has been displayed. An intercom, its speaker and microphone apertures being shown at 10, provides communication with a remote receiving point 47 (FIG. 5) when a talk button 12 is pushed.

A reading slot 13 is associated with a magnetic strip reader and accepts a magnetic strip key card to read the information stored in the magnetic strip and to return the key card to the user.

Any charge or extra money, as well as any money being returned as a result of pressing the coin return button 5, can be removed from coin return pocket 14, as can the magnetic strip key card assigned to the locker to be used.

Figure 2:
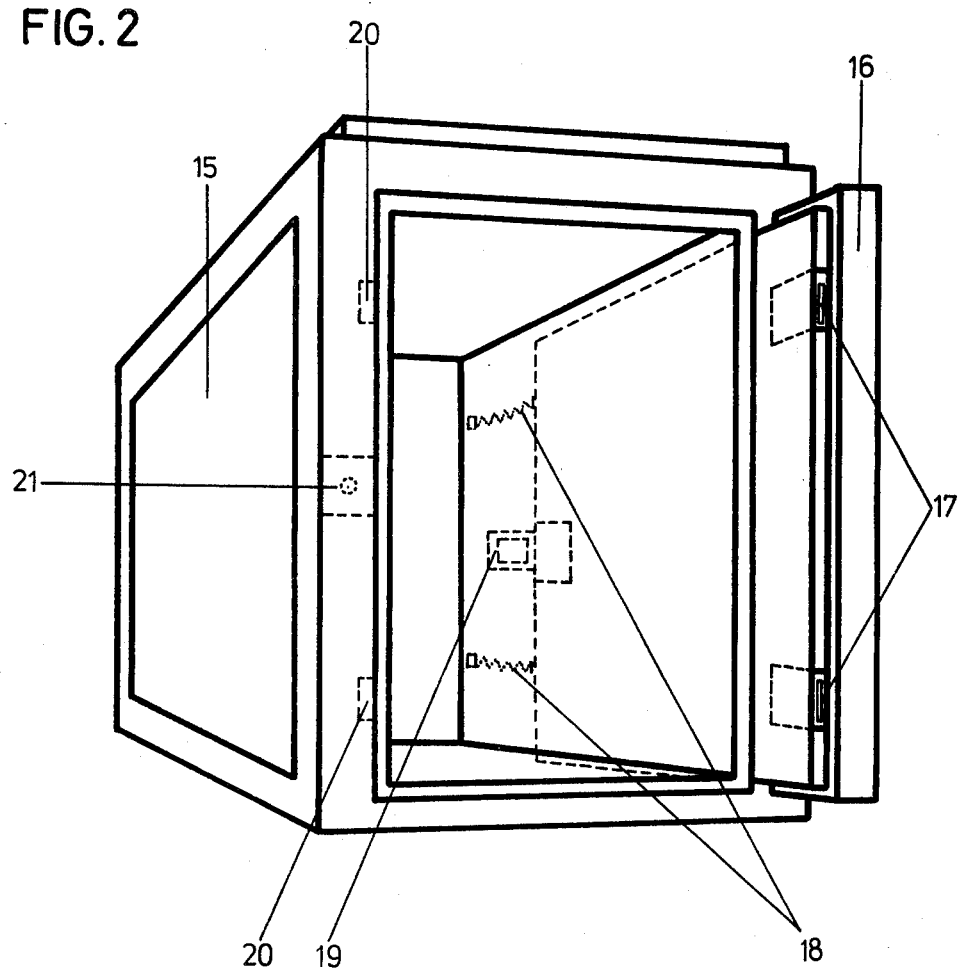
FIG. 2 is an example of the position of the door of a locker, which must be pulled to oepn it, as an unoccupied locker.

FIG. 2 shows an example of a locker 15 in a locker installation which is provided with an open pull door 16 when not occupied. A forward door lock 17 is actuated only when the locker is occupied after assignment by the central control unit, in other words after the pull door 16 has been closed by the user. Prior to this time, the door 16 is held open by retraction springs 18 which can also be designed to execute the opening movement of the door 16 without manual intervention by the user when the opening button 11 (FIG. 1) has been pushed and a specified delay has elapsed.

In order to eliminate the possibility of misuse of an unused locker and to ensure deliberate execution of a locking movement by the door 16 when the illustrated locker 15 is occupied, the door 16 can be provided with a rearward mechanical lock with an electrically controllable release 19 when the locker 15 is unoccupied, this unlocking device allowing the door 16 to close as the locker 15 is being loaded only when the sign 9 (FIG. 1) in conjunction with display 7 (FIG. 1) on the central control unit indicates that the locker 15 of the selected size has been assigned for use following payment of the required charge.

The front locks 17 for locking the locker 15 which is occupied, cooperate with front opening magnets 20, which release the door 16 when the opening button 11 (FIG. 1) is actuated, to open the locker 15 and to remove the stored objects, under electrical control from the central control unit.

In addition, a clear switch 21 to deliver a CLEAR signal when the door 16 is closed is provided on the locker 15.

Figure 3:
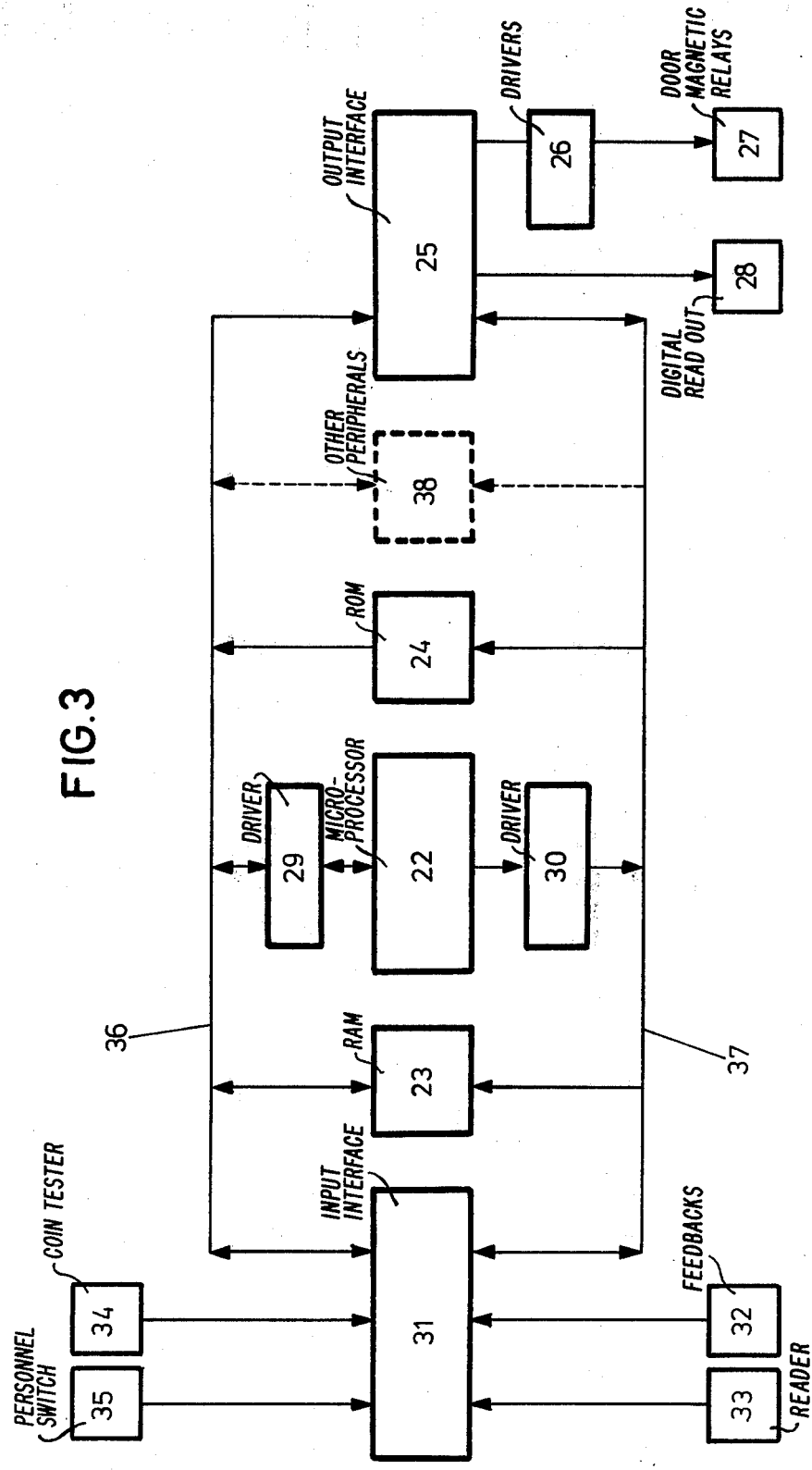
FIG. 3 is a block diagram showing the basic design of a computer and control system inside the central control unit according to FIG. 1.

The basic design of a computer and control system inside the central control unit (FIG. 1) can be seen from FIG. 3. In this block diagram, the control electronics consist essentially of a microprocessor 22 cooperating with a 1 K byte RAM 23 and a 2 K byte programmable ROM 24.

At an output interface circuitry 25, conventional in microprocessor technology, drivers 26 are connected for high-power consumers such as lamps, motors, or coin return devices in the central control unit. In particular, the drivers 26 also actuate door magnet relays 27 to control the opening magnets 20 (FIG. 2) or the rear unlocking devices 19 (FIG. 2), if any.

In addition, a magnetic card checker to record or read binary-encoded information on the magnetic strip of the key card and a digital readout 28 for the display 7 (FIG. 1) are connected to the output interface circuitry 25.

The output interface circuitry 25 is controlled in the manner conventional in microprocessor technology by a data bus 36 as well as an address bus 37, connected to the microprocessor 22 by drivers 29 and 30.

An input interface circuitry 31 for data input is provided, with feedbacks 32 provided for example through the door lock clear switches 21 (FIG. 2), or by control devices in conjunction with a coin tester, a timer, and a checking circuit to determine functioning of actuating elements of the central control unit. These include in particular a coin tester 34 connected to coin slot 1 (see FIG. 1) as well as any additional input or operating switches. In addition, magnetic strip reader 33 is connected to input interface circuitry 31 as the part of the magnetic card checker which allows transfer of data recorded on the magnetic strip to the central control unit.

In FIG. 3, it is also considered that it may be advantageous to arrange the data bus 36 and the address bus 37 in such manner that one or more peripherals 38 can be connected by means of additional ROMs, RAMs, PROMs, inputs or outputs.

When a transition is to be made from simple designs for the central control unit with display 7 and illuminated signs 8, 9, to communication with the user through a television monitor, it is especially advantageous (see below) to design the basic structure of the computer and control system according to FIG. 3 for such additional requirements.

Depending on the site where the locker installation is located, it may be advantageous, in contrast to the situation shown in FIG. 2, not to lock mechanically the doors 16 which have been pulled rearward in unoccupied ones of the lockers 15 and to control the corresponding electromagnetic unlocking device 19 only when the locker has been assigned to a user, but to keep the door 16 locked even when the lockers 15 are not occupied in order to prevent the lockers from being misused for such purposes as disposal and rubbish. Since a particular locker 15 is occupied at the same time that a new test data combination is occupied for storage on the magnetic strip of the key card, it is always possible to determine from the memory of the computer and control device which of the lockers 15 is unoccupied because it was assigned after money was paid, and which of the similarly locked lockers is still available. In this case, a locker door opening device to open a door 16 will be actuated to allow one of the lockers 15 to be used.

Figure 4:
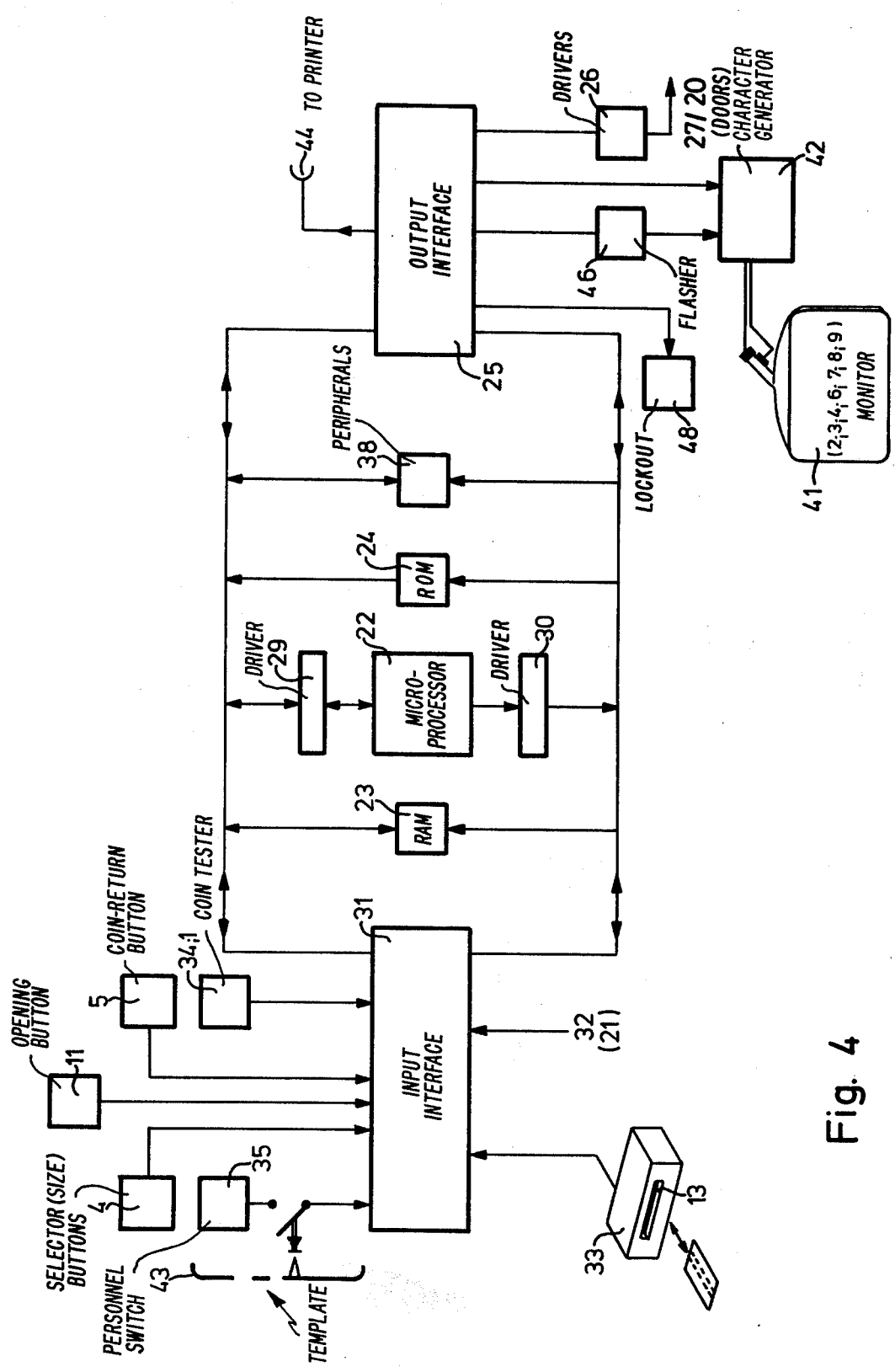
FIG. 4 shows, by contrast with and to expand the block diagram according to FIG. 3, the essential parts of a computer and control system for a modified central control unit with a television monitor for user communication.

When different locker sizes are available, whether a large or small locker 15 is assigned by releasing the door and has its number displayed on the display 7 depends on which of the selector buttons 4 above the desired locker size has been actuated. The control for the sign 8 indicates that the display 7 now shows the amount which has been or to be paid in order to be able to use a particular locker 15 for the basic rental period. Hence, the readout on the display 7 indicates the amount due, while controlling the "pay" sign 8. Advantageously, the sign 8 showing the amount due, which carries for example the inscription "insert more money", is controlled by an intermittent flasher 46 (FIG. 4). If the amount due which has been displayed has not been paid after a certain predetermined time interval, which is about 20 seconds for example, the partial amount which has already been deposited, has passed through a coin tester 34 into a holding box, is released into the coin return pocket 14 (FIG. 1). A new locker selection process can then begin.

The "pay" sign 8 goes out and the sign 9, showing the figure, lights up when the amount due displayed on the display 7 has been paid in full.

A number then appears on the display 7 which represents the locker number. The sign 9 then reads for example "use locker number—"; advantageously, the sign 9 is actuated intermittently by a flasher.

If the size selector button 4 (FIG. 1) is used to select a given locker 15 of a size which is no longer available because all of the lockers 15 of this size are occupied, the "full" sign 2 (FIG. 1) lights up. The money deposited in the coin slot 1 as well as any money in the holding box is released into the coin return pocket 14.

If the customer can be directed to a locker 15 of the desired size, and he has paid the amount required for the basic rental period, a key card provided with a magnetic strip is issued, for example by being dropped into the coin return pocket 14 (FIG. 1). A section of a strip is unrolled for example from a supply roll, until a length corresponding to the length of the key card has been advanced to be cut. After the advancing movement has been completed, a signal is given to actuate a cutting knife to separate this length from the supply roll and to push it out for subsequent use as a key card. The return of the cutoff knife to its resting position after the key card has been cut off from the unrolled supply strip triggers a signal to advance the key card across the write head of a magnetic card checker, so that the entire length of the magnetic strip on the key card records signals from the computer and control system. The information transferred to the magnetic strip is encoded such that the information appears several times in sequence on the magnetic strip and is arranged symmetrically so that the key card can be scanned in both directions by an appropriate reader. Further control of the transport device for advancing the key card causes it to be transferred to a chute for example to drop it into coin return pocket 14.

It may be advantageous to provide a locking circuit which ensures that the display 7 together with locker number display 9 are actuated when the user has removed the key card from the coin return pocket 14 or has removed it from a separate dispensing slot, the slot also being capable of functioning as a reading slot 13 in the central control unit (FIG. 1). This ensures that the user will not be able to use the locker 15 assigned to him before he has received the key card, which otherwise could be removed by an unauthorized person from the central control unit after the user had gone away in the direction of locker 15 with the displayed number.

Before the key card is issued, key or test data information are recorded on the magnetic strip as well as the assigned locker number. The arrangement of these test data during the period of use just beginning for a locker 15 with the displayed number is stored in the computer and control system.

When a locker 15 with this locker number is later rented to another user, as the locker assignment is displayed, a newly generated set of test data information is stored under the locker number, i.e. the test data formerly assigned to this locker number are erased from the memory of the computer and control system. This ensures that no one with the old key card from this locker 15 or any other can open it later because the old key card will contain test data which will not recur later on as a result of the pattern of the test data generated.

The magnetic strip on the key card can also be used to store time data, namely the date and especially the time of day when the locker was occupied.

Combining this time information with the other test data information generates a test data set automatically which cannot repeat. Moreover, it is advantageous to use a random generator to produce test data.

When generating test data which do not include the time of day, it will suffice to store the time which has elapsed since the start of the locker rental period in the computer and control system, so that the additional charge can be imposed if the basic rental period is exceeded.

It is advantageous to control the locker 15 assigned to the user with a variable delay in releasing it to remove the contents, but also if possible to free it for use, in other words, by locking the door 16. This ensures that the assigned locker 15, whose number has been displayed on the readout 7 of the central control unit, will actually be used by the authorized person after he reaches the location of this particular locker 15 and not by any other person who might happen to be there and might for example notice that the particular door 16 had been released. The user can then deposit his luggage in the locker and the lock door 16 by pushing it shut. A CLEAR signal from the clear switch 21 informs the computer and control system of the fact that the assigned locker is now occupied. From this point on, the occupation time is determined and stores in RAM 23.

If the user did not actuate the locker size selector button 4 first on the simple control unit, but deposited money in coin slot 1, instruction panel 3 flashes the text "Select locker size", for 20 seconds for example, with arrows pointing to selector buttons 4. If neither of the selector buttons 4 is actuated, after this period of time elapses the money which was deposited and held in the holding box drops into the coin return box 14. However, if one of the selector buttons 4 is actuated during this period of time, the process described above is completed by the issue of the key card and the display of a locker number.

If the user determines when he reaches the assigned locker 15 that it is too small for example for his baggage or that it is dirty unusable for some other reason, he can get his money back within a certain period of time by pressing the button 5 and be assigned a new locker 15 after making a new request. The same process can be provided for this money return and new selection after the storage time has elapsed for removal of the deposited material, namely, insertion of key card in the reading slot 13 and actuation of the opening button 11. Because the clear switch 21 did not give a signal, because the door 16 was not closed, the money is returned to the coin return pocket 14 instead of going from the holding box into the coin box.

Instead of this arrangement, however, means can be provided to actuate the coin return button 5 after a predetermined period of time has alapsed after the readout 7 showing the assigned locker number has come on.

In the event that use of an assigned locker 15 is declined, in other words if the coin return from the holding box is triggered without actuating the clear switch 21, this fact is recorded in a counting and lockout device 48 (See FIG. 4 and 5) in the computer and control system. After such failure to use an assigned locker 15 has occured several times, for example three times, the computer and control system automatically locks out locker 15 with this number so that in the future it will no longer be assigned to a user until the lockout has been released by maintenance personnel after checking out the situation. It may be advantageous to transmit an automatic signal to a remote monitoring station in order to simultaneously record there that one of the available lockers 15 has been rejected.

If a locker 15, once assigned, is not used within a predetermined period of time despite payment of the required charge, in other words if the CLEAR switch 21 is not actuated, this particular locker 15 will be locked again in the empty state, for example with its door 16 open according to FIG. 2. This is designed to prevent tampering. For this reason, no locker next to this locker will be assigned until it has been relocked, but other free lockers will be used in the selection process.

To open the locker to remove stored goods, the key card, for example with the magnetic strip downward, is inserted in either lengthwise direction in the reading slot 13 and pulled by the reader 33 of the magnetic card checker in order to scan the magnetically stored information and to return the key card.

If the key card is inserted in the reading slot 13 within the basic rental period for which payment has already been made, which can be determined from a comparison of the time at that moment with the time at which the assigned locker 15 was occupied, depending on the information stored in the computer and control system by means of the microcomputer 22 in known fashion, the display 7 can be caused to display a number which shows the locker number in accordance with the signal from the sign 9. By actuating the opening button 11, the locker locking and opening device on the door 16 is controlled. Advantageously, this consists only of a temperary pre-unlocking, i.e. the door 16 is opened by the user. If the latter has not moved, or has not moved quickly enough, from the central control unit to the particular locker 15 with the displayed number, this particular door 16 is automatically locked again to prevent unauthorized opening by third parties. In the case of a pull door 16 as shown in FIG. 2, with rear locking, the door 16 is pulled in automatically and locked so that the baggage cannot be removed without difficulty.

If the user forgets the number of the locker on his way from the central control unit to the assigned locker 15 to be emptied, he can return to the central control unit and reinsert the key card in the reading slot 13 to cause the numbers to appear again on display 7. As long as the locker 15 with this number has not been reoccupied, the same test data information will be stored in the computer and control system which is on the magnetic strip of the key card, and the reader of the magnetic card checker will therefore respond by displaying the locker number when this key card is inserted.

When the locker 15 has been opened and is clear for reassignment, a modified test data set is generated by the microcomputer 22, transmitted by the computer and control system (FIG. 3) and the writer of the magnetic card checker to the magnetic strip on the new key card to be issued, and simultaneously stored in the RAM 23 of the computer and control system. From this point on, the key card which was previously issued for this locker number is no longer usable either to control the locker locking and opening device or to control the locker number display on the display 7; the computer and control system no longer contains any test data information which corresponds to the test data information recorded on the old key card.

However, if it is necessary to determine the locker number information or other information contained on the magnetic strip of a key card of this kind which is no longer valid, the personnel switch 35 can be used to turn on the reader 33 of the magnetic card checker including the locker number sign 9, and the display 7 separately, in other words bypassing the test data control safety switch.

Overpayments can be refunded in the event of overpayment upon initial or subsequent deposit of money.

If the key card is read to remove the goods stored in a particular locker 15 only after a period of time has elapsed which is specified as the maximum rental period, the special display 6 can be actuated which shows that the maximum storage time has been exceeded and the user must go to the guard's desk or to another place, for example to collect his goods which have been stored there in the meantime.

For this case, and also if difficulties arise in connection with understanding how to use the central control unit, the talk button 12 can be actuated to put the user in touch with a remote receiving station which can give the user information on how to proceed.

The block diagram in FIG. 4 includes a television monitor 41 to inform the user, the monitor 41 being controllable by any suitable character generator circuit 42 of known type (see for example ELEKTRONIK 1976, No. 4, pp 71-75) for data display.

Figure 5:
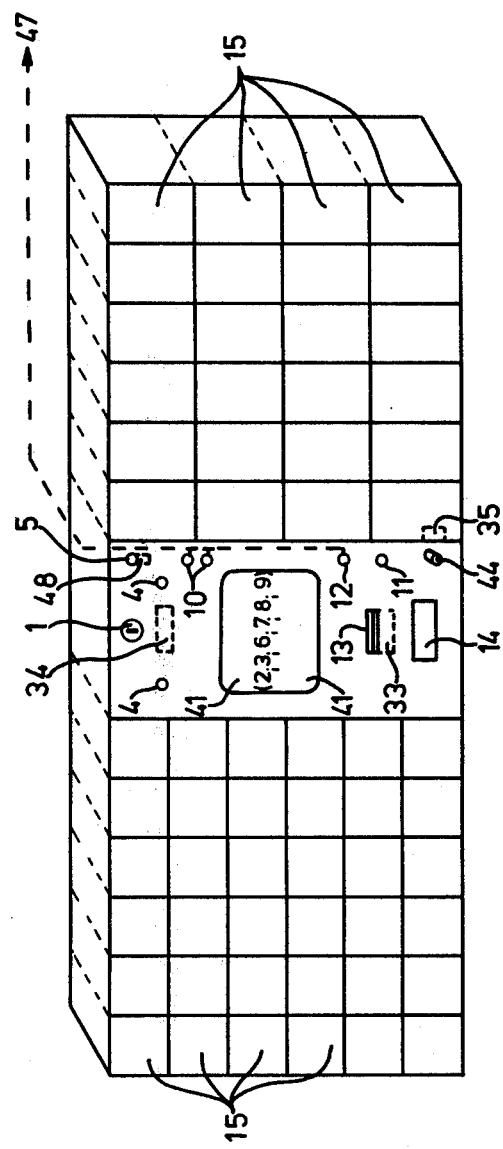
FIG. 5 shows a front view of a locker installation with two different sizes of lockers and a central control unit, with a television monitor as shown in FIG. 4.

When a locker installation is used with a central control unit as in FIG. 5, instead of the various separate information displays as in FIG. 1, a central television monitor 41 is used. The data display on the monitor 41 informs the user how to proceed to carry out the operating steps described in proper sequence. The charge and locker number displays of the type described above can also be replaced by appropriate information displayed in the monitor 41.

In FIG. 4, the above-mentioned personnel switch 35 is shown, which is operable when the mounting template has been placed on the central control unit. This ensures that the operating elements shown in FIG. 5 now have other functions, namely functions which are required by maintenance personnel to check the proper functioning of the computer and control system. No separate switches in or outside the central control unit are required for such testing procedures othen than the function converter in the form of the personnel switch 35 which is not accessible to unauthorized persons.

This personnel switch 35 is arranged in particular to determine from the central control unit the status of the individual lockers 15 in the locker installation, whereby the locker 15 being interrogated at a given moment has its locker number displayed on the display 7 (FIG. 1) or on the television monitor 41 (FIG. 5).

In addition, the personnel switch 35 can be used to change the function of one of the buttons provided on the central control unit to lock a particular locker 15 which could otherwise be assigned, because for example some irregularities have arisen in conjunction with this locker which must be eliminated.

In the interest of a high degree of operating convenience for maintenance and control personnel it is advantageous by another setting of the personnel switch 35 to check the amount of money which should be in the coin box and display the results on the display 7 or the monitor 41, which can also include controlling the coin return device for making change or returning money if the locker is not used.

Connections 44 for a printer for this cash status interrogation permits printing out the expected amount and performing a simplified calculation. If a self-testing program is provided for the computer and control system, this printed can also print out the errors found, on the basis of which the necessary maintenance work can be pin-pointed.

Finally, it is advantageous for practical use of a locker installation of the type according to the invention to provide in the computer and control system a circuit for collecting statistical data on the frequency of use and average occupancy time of the individual lockers and to read the results using the personnel switch 35 or with a printer, because this information can be useful in devising service contracts for locker systems of the type according to the invention and obligations of financial significance derived from such contracts.

The scope of the invention shall be understood to include the lockers 15 not only conventional luggage lockers in locker installations, such as those installed at railroad stations or airports, but also cabinet-type lockers, such as used to hold clothing in public baths, sports facilities, theater cloakrooms or factories for temperary storage of clothing. Moreover, the invention can be used advantageously in all kinds of vending machines in which the goods offered are contained in individual compartments whose doors can be opened to remove the goods after making a selection and depositing the proper amount of money. If the invention is to be used in the service sector, for example in parking garages, the locker arrangement described above can be used to assign a certain parking stall and the described handling of the locker door to actuate the clear switch 21 can be changed to the activation of a sensor installed in the corresponding parking stall to signal to the central control unit that the stall is occupied. In this kind of application according to the invention the described opening of a locker door when the locker is occupied can correspond to a preferably optical signal which contains information on the assignment of a parking stall; the authorized driver is then assisted in finding the stall to which he has been assigned, and if a vehicle is parked in a stall for which this signal has not been given, this indicates to the guards or a sensing and controlling system that a vehicle has been parked in this stall without authorization, namely without having previously consulted the central control unit.

It will be obvious to those skilled in the art that various changes may be made without departing from the scope of the invention and the invention is not to be considered limited to what is shown in the drawings and described in the specification.

The microprecesser for controlling the execution of the function described may be of any commercial type, however preferably the type 2650 made by Signetics Int. Corp., 811 East Arges, 9052 Sunnyvale, 94086 California is used. The specific programming of a microprocessor according to those prescribed logic functions, including to the switch over to an altered routine upon activation of the personell switch, can be realized by anyone skilled in the art; such routines however upon request are also commercially available from the software service companies.

What is claimed is:

1. In a locker installation having a plurality of lockers, a central control unit with a memory and a circuit connected thereto for manual interrogation and display of the occupancy status, and upon manual interrogation of the control unit, for temporarily effective and individual control of respective locker lock opening devices for the respective lockers, the improvement wherein a selector button, a payment due display, a payment comparator, a test data generator, a locker number display, a key card dispenser equipped with a magnetic strip recorded for the locker number and variable test data, as well as a temporarily effective locker door unlocking device, are coupled to circuit means for controlling occupation and access to said lockers, said circuit means being provided with a computer and control system (microprocessor 22) with memories; a key card reader with test data coincidence control circuitry is provided for reopening of individual doors of said lockers, said reader being connected to an occupied-time-determining circuit, the amount due display, the payment comparator, the locker number display and the temporarily effective locker locking and opening device.

2. A locker installation according to claim 1, including an opening button and a variable time delay circuit responsive to the output thereof for opening the locker locking and opening device.

3. A locker installation according to claim 1 or claim 2, wherein the amount due display is connected to a flasher and the locker number display and opening button are locked out during actuation of said flasher.

4. A locker installation according to claim 1 or claim 2, including a coin return button connected to a counting and lockout device for non-occupation of an unlocked locker, said locker locking device being connected to its counting result output.

5. A locker installation according to claim 1 or claim 2, which is equipped with a personnel switch for varying the function of the actuation elements in the central service unit by means of intervening in the internal organization of the computer and control system upon the actuation of this personnel switch by authorized persons for servicing purposes, wherein a mounting template for the central service unit is provided as an information carrier with respect to the new functions of the actuation elements, which template is equipped with means for making the personnel switch accessible.

6. A locker installation according to claim 1 or claim 2, which is equipped with a personnel switch for intervention in the internal organization of the computer and control system for the purpose of direct triggering of one of the displays, said personnel switch being coupled to said key card reader, and said key card reader being coupled to a display.

7. A locker installation according to claim 1 or claim 2, including a television monitor provided in said computer and control system (microprocessor 22) via a character generator circuit depending on instructions and illuminated signs.

* * * * *